(12) United States Patent
Ehrentraut et al.

(10) Patent No.: US 10,523,263 B2
(45) Date of Patent: Dec. 31, 2019

(54) MOTOR VEHICLE HAVING TWO MODEMS OF DIFFERENT LTE CATEGORIES

(71) Applicant: AUDI AG, Ingolstadt (DE)

(72) Inventors: Herbert Ehrentraut, Beilngries (DE); Jörg Plechinger, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/320,352

(22) PCT Filed: Jul. 24, 2017

(86) PCT No.: PCT/EP2017/068678
§ 371 (c)(1),
(2) Date: Jan. 24, 2019

(87) PCT Pub. No.: WO2018/028977
PCT Pub. Date: Feb. 15, 2018

(65) Prior Publication Data
US 2019/0245576 A1    Aug. 8, 2019

(30) Foreign Application Priority Data
Aug. 10, 2016    (DE) .................. 10 2016 214 910

(51) Int. Cl.
*H04L 1/18* (2006.01)
*H04B 1/401* (2015.01)
(Continued)

(52) U.S. Cl.
CPC ............... *H04B 1/401* (2013.01); *H04L 1/18* (2013.01); *H04W 4/40* (2018.02); *H04W 4/90* (2018.02); *H04W 52/02* (2013.01)

(58) Field of Classification Search
CPC ........... H04B 1/401; H04B 1/38; H04W 4/90; H04W 4/40; H04W 52/02; H04L 1/18; H04L 67/12
See application file for complete search history.

(56) References Cited

U.S. PATENT DOCUMENTS

2007/0190950 A1    8/2007 Madhavan et al.
2011/0282564 A1*  11/2011 Park .................. G06Q 10/06
                                                   701/117
(Continued)

FOREIGN PATENT DOCUMENTS

| KR | 20070006139 A | 1/2007 |
| KR | 20090061224 A | 6/2009 |
| KR | 20160046191 A | 4/2016 |

OTHER PUBLICATIONS

International Search Report and Written Opinion of the International Search Authority directed to related International Patent Application No. PCT/EP2017/068678, dated Oct. 5, 2017, with attached English-language translation; 26 pages.
(Continued)

*Primary Examiner* — Syed Haider
(74) *Attorney, Agent, or Firm* — Sterne, Kessler, Goldstein & Fox P.L.L.C.

(57) ABSTRACT

An embodiment relates to a mobile communication device for a motor vehicle, wherein the mobile communication device is adapted to provide a wireless connection to a mobile communication network, and a control unit of the mobile communication device is programmed to transmit and/or to receive data via the wireless connection in a basic mode through a basic modem circuit, which provides a predetermined basic bit rate. According to the invention, an additional modem circuit is provided, which provides a low bit rate that is lower than the basic bit rate for transferring data via the wireless connection, wherein the control unit is programmed to identify at least one predetermined switching event and, when the switching event is identified, to switch from the basic mode to an additional mode in which the control unit transmits and/or receives data through the additional modem circuit.

20 Claims, 1 Drawing Sheet

(51) Int. Cl.
  *H04W 4/90*   (2018.01)
  *H04W 4/40*   (2018.01)
  *H04W 52/02*  (2009.01)

(56) References Cited

U.S. PATENT DOCUMENTS

| | | |
|---|---|---|
| 2012/0207021 A1 | 8/2012 | Rahman et al. |
| 2012/0303203 A1* | 11/2012 | Olsen ............... G08G 1/012 701/29.1 |
| 2013/0012123 A1* | 1/2013 | DeLuca ............ A45C 13/18 455/39 |
| 2013/0035110 A1* | 2/2013 | Sridhara ........... H04W 4/029 455/456.1 |
| 2013/0265178 A1* | 10/2013 | Tengler ............. H04W 4/00 340/989 |
| 2015/0222553 A1 | 8/2015 | MacDonald et al. |
| 2016/0205628 A1* | 7/2016 | Konno ............... H04W 8/22 370/311 |
| 2016/0219576 A1* | 7/2016 | Ekici ................. H04W 48/18 |
| 2016/0316358 A1 | 10/2016 | Orr et al. |
| 2017/0142204 A1 | 5/2017 | Kodaypak et al. |

OTHER PUBLICATIONS

International Preliminary Report on Patentability directed to related International Patent Application No. PCT/EP2017/068678, dated Jun. 27, 2018, with attached English-language translation; 17 pages.

* cited by examiner

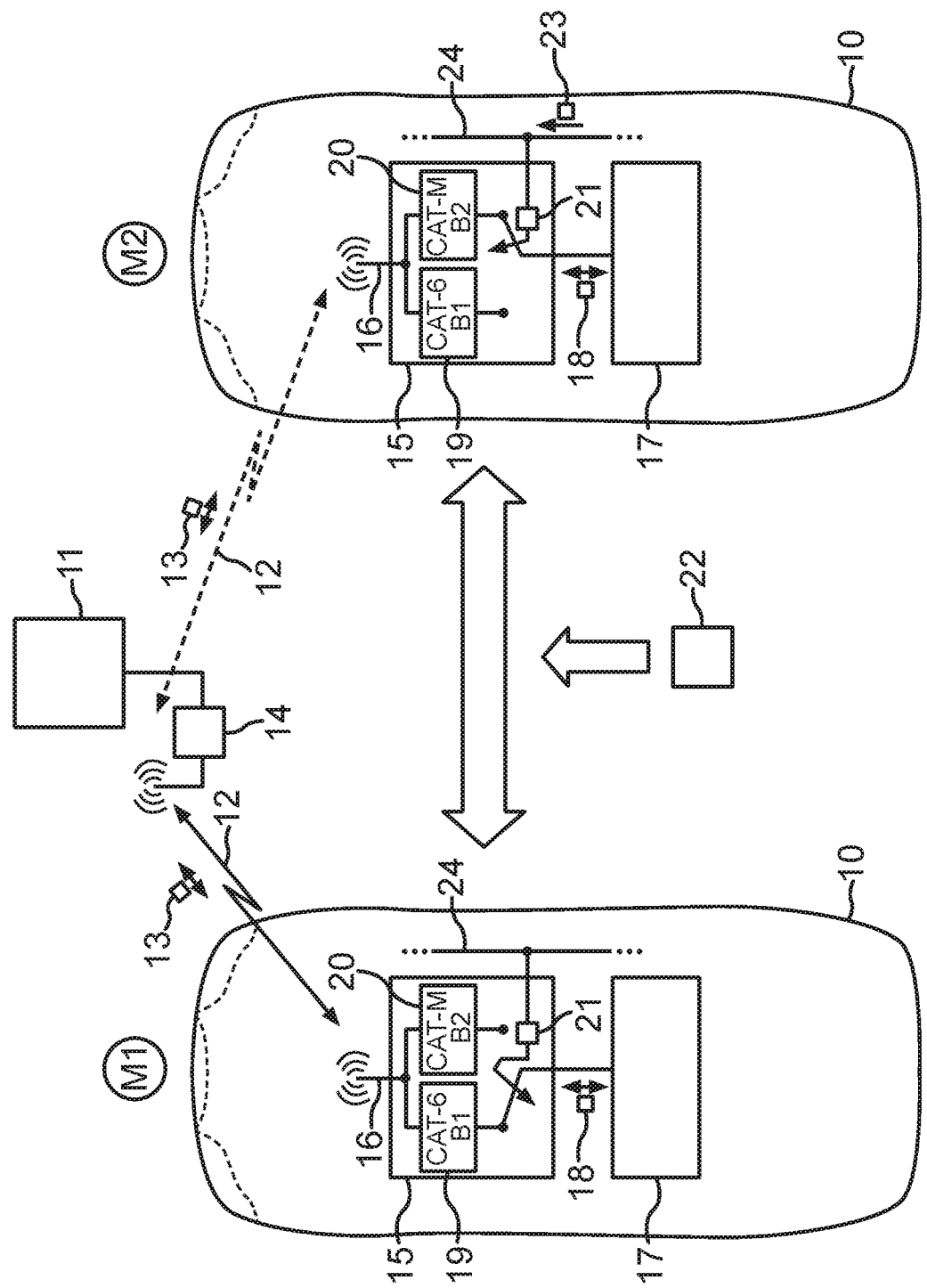

MOTOR VEHICLE HAVING TWO MODEMS OF DIFFERENT LTE CATEGORIES

TECHNICAL FIELD

An embodiment relates to a mobile communication device for a motor vehicle. A wireless connection to a mobile communication network can be provided or established by way of the mobile communication device. A basic modem circuit is provided for the transfer of data, for example a transfer according to category 4 (CAT-4) or higher (CAT-5, CAT-6 and so forth) of the Long Term Evolution (LTE) standard. A further embodiment also relates to a method for operating the mobile communication device. Modem (modulation-demodulation) is an abbreviated designation for a modem circuit.

BACKGROUND

The modem circuit of a mobile communication device enables the transfer of digital data, which is to say bits or bit sequences, via a wireless connection by impressing the data on a carrier signal, having an established carrier frequency, during transmission by modulation or by extracting the data during reception therefrom by demodulation. Depending on the design of the modem circuit, a different transfer rate results during the transfer of the digital data. For example, the modem circuit establishes the form in which the digital data is transferred by way of quadrature amplitude modulation (QAM) and/or how many channels having differing carrier frequencies can be bundled for the transfer. A description of such a modem circuit is known from KR20090061224A, for example.

Since the operation of modem circuits requires electrical energy, these are generally deactivated in parked motor vehicles. As a result, however, the motor vehicle can no longer be reached from the outside via a wireless connection, for example for a software update of control devices of the motor vehicle. It is known from KR20160046191A in this regard to continue operating a modem circuit as a function of the state of the vehicle battery when a motor vehicle is parked.

It is known from KR20070006139A to cyclically activate a modem circuit, while an internal combustion engine of a motor vehicle is shut off. In this way, it is possible to re-establish a wireless connection to the motor vehicle at predetermined time intervals.

If the wireless connection is weak, a base station can transmit a control signal to a mobile communication device causing the mobile communication device to amplify the transmission signal thereof, which also increases the transmission range.

A method is known from US 2015/0222553 A1 for transferring mobile communication data to a motor vehicle over different data channels. The data to be transferred is divided among the different channels using so-called traffic shaping so as not to block the data requiring the highest transfer rate with low priority data. The different channels can be provided by simultaneously providing different wireless connections or reserving multiple channels in an existing wireless connection.

A method is known from US 2007/0190950 A1 for being able to transmit both speech and data via a voice channel of a mobile communication device so that it is also possible to transfer device data in a call center during a call. So as to achieve the greatest possible bandwidth for the voice channel used, corresponding check bits are used during the establishment of the mobile communication link. The data rate is defined for an existing wireless connection, which is required to establish the voice channel to begin with. The data rate is varied by adapting the encoding of the speech.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 1 shows a schematic illustration of one embodiment of the mobile communication device.

DETAILED DESCRIPTION

It is the object of the presented embodiments to be able to adapt a mobile communication device in a motor vehicle to available electrical power and/or the conditions of a radio link.

An embodiment provides a mobile communication device for a motor vehicle. The mobile communication device is adapted to provide a wireless connection to a mobile communication network. This can take place by operating an antenna by way of a transmitter and a receiver on the one hand, and/or by operating what is known as a protocol stack, such as an LTE protocol stack, for managing a mobile communication, on the other hand. To transfer data between the antenna and the protocol stack, modulation is required during transmission, and demodulation is required during reception, so as to couple the baseband in which the digital data is provided (during transmission) or needed (upon reception) at the carrier frequency of the mobile communication channel. For this purpose, a control unit of the mobile communication device is used, in a basic mode, to transmit and/or to receive the data by way of a basic modem circuit of the mobile communication device via the mobile communication link. The basic modem circuit represents a modem. The basic modem circuit is designed so as to provide a predetermined basic bit rate as the transfer rate for the transfer via the wireless connection.

A greater basic bit rate, however, requires a greater level of circuitry, with increased circuitry complexity of the basic modem circuit. Consequently, the greater the transfer rate, the greater is the needed amount of electrical energy or electrical power for transferring data in the case of a basic modem circuit.

So, in order to reduce the power requirement, for example, when a motor vehicle is parked, it is provided according to the embodiment that the mobile communication device comprises an additional modem, in the form of an additional modem circuit, which provides a low bit rate, less than said basic bit rate of the aforementioned basic modem circuit, to serve as the transfer rate for transferring data via the wireless connection. It may thus be provided that the low bit rate of the additional mode is preferably less than half, and in particular less than 10 percent, of said basic bit rate for the basic mode.

The control unit of the mobile communication device is now adapted to identify at least one predetermined switching event and, when such a switching event is identified, to switch from the basic mode into an additional mode in which the control unit transmits and/or receives data by way of the additional modem circuit. Instead of the basic modem circuit, as used in the basic mode, the additional modem circuit is used in the additional mode to transfer (transmit and/or receive) data.

The additional modem circuit can be provided as an additional or separate chip set, in addition to the actual basic modem circuit. Alternatively, the basic modem circuit and the additional modem circuit can also be provided by a shared integrated circuit (IC). It is also possible for a single, shared modem circuit to be provided as the basic modem circuit and the additional modem circuit, which is to say shared hardware, which is alternately operated in the basic mode and in the additional mode by way of configuration data and/or by way of operating software. A current configuration and/or current programming of the modem circuit thus results in the basic modem circuit and the additional modem circuit. A power requirement of the additional modem circuit for a transfer of a predetermined data volume is less than a power requirement of the basic modem circuit for a transfer of the same data volume. The reason behind this is that a lower transfer rate is used. For example, for the additional modem circuit, the power requirement may be reduced by using less complex or simpler quadrature amplitude modulation (QAM), or by entirely eliminating QAM. For example, 64-QAM may be provided for the basic mode by way of the basic modem circuit, whereas QAM may be dispensed with for the additional mode.

The invention yields the advantage that in the mobile communication device, using an otherwise identical composition, the provision of the additional modem circuit also allows the transmission operation and/or the reception operation to be continued, for example, when a motor vehicle is parked, at a lower electrical power requirement.

So as to provide the combination of a basic modem circuit and an additional modem circuit, it is provided that the basic modem circuit and the additional modem circuit each are LTE modem circuits of differing performance categories. LTE modem circuits are generally divided into the categories CAT-0 to CAT-8. Additionally, there are M categories and NB categories for devices to be operated in what is known as the Internet of Things (IoT). The performance categories can be learned from the 3rd Generation Partnership project (3GPP), for example.

The higher the ordinal number of the category, the greater is the available transfer rate. The invention is based on the realization that the energy requirement or power requirement of the corresponding modem circuit also rises with the ordinal number of the category. By combining modem circuits of differing performance categories, it is thus possible to provide the basic mode and the additional mode.

It is provided that the performance category of the basic modem circuit is greater than CAT-3, which is to say, for example, CAT-4 or CAT-5 or greater. During normal operation, the transfer of data can thus be made possible via an LTE connection at a transfer rate of 100 Mbit/s (megabit per second) for the downlink (reception) or greater. With respect to the additional modem circuit, it is provided that a performance category CAT-1 or CAT-0 or one of the categories for supporting machine type communication (machine-to-machine communication) is used (for example, CAT-M, CAT-M1, CAT-M0 or IEEE802.11ah). In particular, an NB-IoT technology (such as CAT-NB or CAT-NB1) is provided. In the additional mode, the power requirement for the transfer of data can thus be reduced compared to the basic mode.

Several embodiments also include advantageous refinements, the features of which yield additional advantages.

Preferably, it is provided that an effective bandwidth of the additional modem circuit is lower than an effective bandwidth of the basic modem circuit. This decreases susceptibility to interference during the transfer of data in the additional mode. Moreover, a range of reception can also be increased by reducing the effective bandwidth so that it is possible, for example, for a motor vehicle located in an underground parking garage, for example, to still be reached from a mobile communication network via a wireless connection.

Preferably, a spread spectrum is provided with the additional modem circuit that is greater than the spread spectrum provided with the basic modem circuit. This reduces the susceptibility to interferences even with an increased range of the mobile communication link. The aforementioned effective bandwidth is the bandwidth used prior to employing the spread spectrum technique. In general, it is preferably provided that, in addition or as an alternative to the spread spectrum, a modulation process and/or a forward error correction (FED) and/or an automatic repeat request (ARQ) protocol is different in the additional mode than in the basic mode, whereby a transmission range and/or a link budget are greater in the additional mode than in the basic mode. The greater transmission range is characterized in particular in that a predetermined signal to noise ratio (SNR) and/or a predetermined transfer error rate threshold in the additional mode results at a larger distance from the motor vehicle than in the basic mode, at the same ambient noise. The link budget is a way of quantifying a link's performance. The link budget is a criterion that can be improved, in particular, by way of the performance category M (Cat. M or CAT-M) or also by way of the NB-IoT (narrowband Internet of Things) technology.

The switch from the basic mode into the additional mode is carried out in the described manner as a function of a switching event, which is identified or detected by the control unit. For switching from the basic mode into the additional mode, the mobile communication device can be logged off the mobile communication network, the additional model circuit can be activated, a protocol stack can be loaded for the data transfer according to the intended performance category as a software protocol stack, and then the mobile communication device can be logged back onto the mobile communication network.

One embodiment provides that the control unit is adapted to identify, as a switching event, that no useful data has been transmitted via the wireless connection for more than a predetermined minimum duration. Thus if, aside from the control data, which is known, for managing the wireless connection, no useful data such as voice data or Internet data is being transmitted, for example for a different vehicle component, via the wireless connection, it may be provided that the control unit switches to the additional mode. In this way, the mobile communication device advantageously remains connected to a mobile communication network, without requiring additional energy or power needed to operate the basic modem circuit. The basic modem circuit can be de-energized or deactivated since the data transfer takes place via the additional modem circuit.

According to one refinement, the control unit is adapted to identify, as a switching event, that an emergency call signal indicates that an automatic emergency call is to be emitted via the wireless connection. This mechanism is also referred to as eCALL. In the event that an automatic emergency call is to be emitted, it is advantageous to utilize the greater range of an additional modem circuit which, even though it has a lower transfer rate (namely the low bit rate), can ensure a lower effective bandwidth and/or a greater spread spectrum, for example, whereby the range and/or the robustness relative to interferences of the wireless connection are increased compared to the basic mode.

According to another refinement, the control unit is adapted to identify, as a switching event, that a connection error signal, which indicates an interrupted wireless connection or an unsuccessful establishment of the wireless connection, fulfills a predetermined termination criterion. The connection failure signal is known as radio link failure (RLF). This may be generated by the mobile communication device itself, if one of the described failures is present. The termination criterion may be, for example, that the connection failure signal has been generated more frequently than a predetermined maximum number of times within a predetermined time period. If the wireless connection thus cannot be reliably operated by way of the basic modem circuit for the higher transfer rate (namely the basic bit rate), the device is switched to the additional mode, in which a lower transfer rate, namely the low bit rate, is used, resulting in a more robust mobile communication link.

Preferably, it is also provided that the control unit is adapted to identify, as a switching event, that the motor vehicle is parked. This can be identified, for example, based on an ignition-off signal, which can be received by the mobile communication device in the motor vehicle, for example, via a communication terminal, such as a Controller Area Network (CAN) bus. It may also be provided that a predetermined minimum duration with the ignition signal off will have to be identified, following the reception of the ignition-off signal, for the switch from the basic mode into the additional mode to be carried out. When the motor vehicle is in the parked state, a mobile communication link can then continue to be established to the motor vehicle by way of the additional modem circuit, for example to receive a telematics signal or a GPS (global positioning system) position of the motor vehicle from the motor vehicle and/or to carry out remote maintenance of a control device of the motor vehicle, such as a software update. Another switching event that can be identified by the control unit in the motor vehicle may be where a driving speed of the motor vehicle is greater than a predetermined threshold value for longer than a predetermined minimum duration of time. If the motor vehicle thus drives faster than the speed described by the threshold value for the minimum duration, the mobile communication link is operated at a lower transfer rate by way of the additional modem circuit, making it also more robust toward the Doppler effect, for example. The threshold value may be in a range greater than 150 km/h, for example.

The operation of the mobile communication device according to the invention yields the method according to the invention. The mobile communication device according to the invention provides a wireless connection in a manner which is known to a mobile communication network. So as to transfer data, the control unit of the mobile communication device transmits and/or receives the data via the wireless connection in a basic mode by way of a basic modem circuit at a predetermined basic bit rate. If the control unit identifies at least one predetermined switching event, it switches, when the switching event is identified, from the basic mode into the additional mode in which the control unit transmits and/or receives data via the wireless connection not by way of the basic modem circuit, but by way of the additional modem circuit at the low bit rate, which is lower than the basic bit rate. In this way, the transfer takes place at different transfer rates as a function of at least one switching event, for which purpose two different modem circuits are provided in the mobile communication device.

The invention also encompasses refinements of the method according to the invention which include features such as those that have already been described in connection with the refinements of the mobile communication device according to the invention. For this reason, the corresponding refinements of the method according to the invention are not described again here.

An exemplary embodiment of the invention is described hereafter. For this purpose, FIG. 1 shows a schematic illustration of one embodiment of the mobile communication device according to the invention.

The exemplary embodiment described hereafter is a preferred embodiment of the invention. In the exemplary embodiment, the described components of the embodiment in each case represent individual features of the invention which are to be considered independently of one another, which also refine the invention independently of one another and, as a result, shall also be considered to be an integral part of the embodiment, either individually or as a combination other than the one shown. Furthermore, the described embodiment may also be supplemented with addition of the above-described features.

FIG. 1 shows a motor vehicle 10 in two different operating modes, namely in a basic mode M1 and an additional mode M2. The motor vehicle 10 can establish a mobile communication link or, for short, a wireless connection 12 with a mobile communication network 11 for the transfer of data 13. The wireless connection 12 can be provided between a base station 14 of the mobile communication network 11 and a mobile communication device 15 of the motor vehicle 10. An antenna 16 and a control device 17 of the motor vehicle can be coupled by the mobile communication device 15. The control device 17 can additionally, for example, be an integral part of an infotainment system (information-entertainment system). The control device 17 can exchange useful data 18 with the mobile communication network 11 by way of the mobile communication device 15, which is to say at least partially transmit and/or receive useful data 18. The useful data 18 is included as part of the data 13.

The mobile communication device 15 can include two modem circuits for outgoing modulating data 13 to be transmitted and/or for demodulating incoming received data 13, which can be operated alternately: the basic modem circuit 19 can be used in the basic mode M1, and an additional modem circuit 20 can be operated in the additional mode M2. Depending on the modem circuit being operated, the respective other non-operated modem circuit 19, 20 can be shut off during this process, for example.

A control unit 21 of the mobile communication device 15 can switch between the modem circuits 19, 20. The modem circuits 19, 20 can each be a chip set, as they can perform different modulation processes. The two modem circuits 19, 20 can also be provided in the form of a shared integrated circuit. It is also possible for a singular modem circuit to be provided, which may be alternately operated in the basic mode M1 and in the additional mode M2 by way of configuration data and/or by way of operating software. The control unit 21 can comprise an electronic circuit and/or a microcontroller, for example.

The basic modem circuit 19 can be an LTE modem, for example, having a performance category in a range of greater than CAT-3, such as CAT-4, CAT-5, CAT-6, CAT-7, CAT-8, . . . or CAT-16. In this way the corresponding transfer rate provided results in a basic bit rate B1, wherein the bit rate B1 is greater than or equal to 100 Mbit/s.

The additional modem circuit 20 can have a transfer rate corresponding to a low bit rate B2, which is lower than the basic bit rate B1. For this purpose, the basic modem circuit 20 can provide the performance category CAT-M or CAT-M1 or CAT-M0 or CAT-1 or CAT-0 according to the LTE standard.

The motor vehicle 10 comprises Internet of Things infrastructure in that the additional modem circuit 20 provides an M category as the performance category. This creates the option of having the telematics, such as the control device 17, of the motor vehicle 10 run permanently during extended parking phases. Moreover, the attendant narrowband technology (known as the narrowband IOT radio technology standard) increases the range of the wireless connection 12, so that the motor vehicle 10 can also be reached by and/or can reach the mobile communication network 11 in an underground parking garage.

The basic modem circuit 19 is thus specialized for data transfer at a high basic bit rate, for which, however, it also requires a greater operating current and/or quiescent current (stand-by current) than the additional modem circuit 20. In contrast, the additional modem circuit 20 can provide a greater wireless range and, for example, can also provide the mobile communication link 12 if the motor vehicle 10 is parked in an underground parking garage, which would not be possible with the basic modem circuit 19. Moreover, the operating current and/or the quiescent current of the additional modem circuit 20 are lower than in the case of the basic modem circuit 19.

The control unit 21 can switch between the basic modem circuit 19 and the additional modem circuit 20 as a function of a switching event 22, which can be identified by the control unit 21. So as to receive an appropriate event signal 23, which can indicate the switching event 22, the control unit 21 can be connected to a communication bus 24 of the motor vehicle 10, for example. The communication bus 24 can be a CAN bus, for example.

The event signal 23 may indicate, for example, whether an ignition of the motor vehicle 10 is switched on and/or off, whether an emergency call (eCALL) is to be emitted and/or at what driving speed the motor vehicle 10 is traveling. In addition or as an alternative, the control unit 21 can also monitor the point in time since when useful data 18 has no longer been transferred via the mobile communication device 15. If there has been no transmission and/or reception of useful data 18 for a predetermined minimum duration, a switch can be carried out from the basic mode M1 into the additional mode M2. The minimum duration can be more than an hour, for example, and in particular be in a range of one hour to 48 hours. In addition or as an alternative, a switch into the additional mode M2 can be made during a parking phase of the motor vehicle.

It is also possible to monitor whether a connection failure signal of the mobile communication device 15 indicates that the mobile communication link 12 has been terminated or interrupted or could not be established. A switch can then likewise be carried out into the additional mode M2.

In this way, when the basic mode M1 is active, the motor vehicle 10 can be logged off or decoupled from the mobile communication network 11 by the mobile communication device 15 as a function of an external carrier or trigger, namely the event signal 23 or the volume of transmitted useful data 18 or the connection failure signal, for example, the mobile communication device 15 can then be reconfigured, so that the additional modem circuit 20 is activated and a corresponding protocol stack is provided, and thereafter the wireless connection 12 can be re-established by way of the additional modem circuit 20, which is to say the mobile communication device 15 can be logged back on to the mobile communication network 11. Preferably, the same mobile communication network is used.

If a predetermined event for switching back is identified, for example the motor vehicle is re-started following the parking phase and/or the driving speed drops below the threshold value for a predetermined duration and/or a predetermined minimum volume of useful data 18 has been transmitted, a switch from the additional mode M2 back into the basic mode M1 can be carried out so that, instead of the additional modem circuit 20, the basic modem circuit 19 is used for transferring the data 13 again. In this way, the basic bit rate is available again.

Overall, the example demonstrates how the invention can be used to provide a low-power standby mode as an additional mode for a mobile communication device.

The invention claimed is:

1. A mobile communication device for a motor vehicle, the mobile communication device configured to provide a wireless connection to a mobile communication network, the mobile communication device comprising:
   a basic modem circuit;
   a control unit programmed to transmit and/or to receive data via the wireless connection in a basic mode through the basic modem circuit, the basic modem circuit providing said reception and/or transmission at a predetermined basic bit rate; and
an additional modem circuit that provides a low bit rate that is lower than the basic bit rate for transferring data via the wireless connection,
wherein the control unit is further programmed to monitor and identify at least one predetermined switching event, and, when said predetermined switching event is identified, to switch from the basic mode into an additional mode in which the control unit transmits and/or receives data through the additional modem circuit, wherein the basic modem circuit and the additional modem circuit are each LTE modem circuits of differing performance categories, wherein the performance category of the basic modem circuit is greater than a CAT-3 standard, and the performance category of the additional modem circuit is a CAT-1 standard or a CAT-0 standard, or is of a performance category supporting machine time communication,
   wherein the control unit is programmed to monitor and identify, as the predetermined switching event, that the motor vehicle is parked, wherein a state of being parked is identified based on a received electronic ignition-off signal, wherein when a predetermined minimum duration with the electronic ignition-off signal is measured, following the reception of the electronic ignition-off signal, the control unit switches the mobile communication device from the basic mode into the additional mode.

2. The mobile communication device of claim 1, wherein an effective bandwidth of the additional modem circuit is lower than an effective bandwidth of the basic modem circuit.

3. The mobile communication device of claim 1, wherein a spread spectrum is greater, and/or a modulation process and/or a forward error correction and/or an ARQ protocol is different in the additional mode than in the basic mode, wherein said difference or differences between the additional mode and the basic mode collectively result in a greater transmission range and/or a link budget in the additional mode than in the basic mode.

4. The mobile communication device of claim 1, wherein the control unit is programmed to monitor and identify, as a switching event, that no useful data has been transferred via the wireless connection for more than the predetermined minimum duration.

5. The mobile communication device of claim 1, wherein the control unit is programmed to identify, as a switching event, that an emergency call signal indicates that an automatic emergency call is to be emitted via the wireless connection.

6. The mobile communication device of claim 1, wherein the control unit is programmed to monitor and identify, as a switching event, that a connection failure signal, which indicates an interrupted wireless connection or an unsuccessful establishment of the connection, fulfills a predetermined termination criterion.

7. The mobile communication device of claim 1, wherein the control unit is programmed to monitor and identify, as a switching event, that a driving speed of the motor vehicle is greater than a predetermined threshold value for more than the predetermined minimum duration.

8. The mobile communication device of claim 1, wherein the performance category of the additional mobile circuit meets a narrowband Internet of Things (IoT) radio technology standard.

9. The mobile communication device of claim 8, wherein a range of reception of the wireless connection includes an underground parking garage if the mobile communication device is reached by the mobile communication network.

10. The mobile communication device of claim 4, wherein useful data comprises voice data and Internet data.

11. The mobile communication device of claim 1, wherein for switching from the basic mode into the additional mode, the control unit is programmed to log the device off of the mobile communication network, activate the additional modem circuit, and log the mobile communication device back onto the mobile communication network.

12. The mobile communication device of claim 11, wherein to activate the additional modem circuit, the control unit is programmed to log a protocol stock for data transfer according to the intended performance category of the additional modem circuit, as a software protocol stack.

13. A method for operating a mobile communication device for a motor vehicle including:
providing a wireless connection to a mobile communication network via the mobile communication device;
transmitting and/or receiving data via a control unit of the mobile communication device via the wireless connection, in a basic mode, by using a basic modem circuit at a predetermined basic bit rate;
monitoring and identifying at least one predetermined switching event via the control unit, and, when the at least one switching event has been identified, switching the mobile communication device from the basic mode into an additional mode in which the control unit transmits and/or receives data via the wireless connection by using an additional modem circuit at a low bit rate that is lower than the basic rate,
wherein the basic modem circuit and the additional modem circuit are each LTE modem circuits of differing performance categories, wherein the performance category of the basic modem circuit is greater than a CAT-3 standard, and the performance category of the additional modem circuit is a CAT-1 standard or a CAT-0 standard, or is of a performance category supporting machine time communication, and
identifying, via the control unit, as a switching event, that the motor vehicle is parked, wherein a state of being parked is identified based on the control unit receiving an electronic ignition-off signal, wherein when a predetermined minimum duration with the electronic ignition-off signal is measured, following the reception of the ignition-off signal, the control unit switches the mobile communication device from the basic mode into the additional mode.

14. The method of claim 13, wherein the performance category of the additional mobile circuit meets a narrowband Internet of Things (IoT) radio technology standard.

15. The method of claim 13, wherein the control unit monitors and identifies an external carrier or trigger as a switching event, wherein the external carrier or trigger may comprise the volume level of transmitted useful data dropping below a minimum threshold or a speed of the vehicle which the mobile communication device is operating dropping below a minimum threshold.

16. The method of claim 13, wherein after switching the mobile communication device from the basic mode to the additional mode, in response to the motor vehicle being parked as a switching event, in which the control unit transmits and/or receives data via the wireless connection by using the additional modem circuit, if the motor vehicle is subsequently re-started, then the mobile communication device is switched by the control unit from using the additional modem circuit back to using the basic modem circuit at the predetermined basic bit rate.

17. The method of claim 15, wherein after switching the mobile communication device from the basic mode to the additional mode, in response to the motor vehicle speed dropping below a minimum threshold as a switching event, in which the control unit transmits and/or receives data via the wireless connection by using the additional modem circuit, if the motor vehicle speed subsequently exceeds the minimum threshold, then the mobile communication device is switched by the control unit from using the additional modem circuit back to using the basic modem circuit at the predetermined basic bit rate.

18. The method of claim 13, wherein the wireless connection is provided by the mobile communication device, wherein the mobile communication device comprises an antenna and a protocol stack.

19. The method of claim 18, wherein the mobile communication device modulates outgoing data for transmitting data between the antenna and the protocol stack.

20. The method of claim 18, wherein the mobile communication device demodulates incoming data during reception, transmitting data between the antenna and the protocol stack.

* * * * *